US005402156A

United States Patent [19]

[11] Patent Number: 5,402,156
[45] Date of Patent: Mar. 28, 1995

Donahue et al.

[54] SLOW SCAN STITCHING MECHANISM

[75] Inventors: Frederick A. Donahue, Walworth; Paul J. Rowe, Williamson, both of N.Y.

[73] Assignee: Xerox Corporation, Stamford, Conn.

[21] Appl. No.: 905,608

[22] Filed: Jun. 29, 1992

[51] Int. Cl.$^6$ ......................... G01D 15/16; B41J 19/06

[52] U.S. Cl. ................................. 346/139 D; 347/37; 400/328

[58] Field of Search ........................ 346/139 R, 139 D; 400/112, 185, 328; 347/37

[56] References Cited

U.S. PATENT DOCUMENTS

| | | | |
|---|---|---|---|
| 4,535,344 | 8/1985 | Noda | 346/139 D |
| 4,571,599 | 2/1986 | Rezanka | 346/140 R |
| 4,774,530 | 9/1988 | Hawkins | 346/140 R |
| 4,806,034 | 8/1985 | Plummer | 346/139 D |
| 4,952,084 | 8/1990 | Maruyama | 400/120 |

*Primary Examiner*—Benjamin R. Fuller
*Assistant Examiner*—Craig A. Hallacher
*Attorney, Agent, or Firm*—Robert A. Chittum

[57] ABSTRACT

A translatable information transfer device, such as ink jet printhead, is stepwise advanced by a mechanism consisting of a lead screw axially spring biased at one end, cam surface provided at the other end of the lead screw, fixed cam follower which engages the cam surface, and a carrier for the information transfer device mounted on the lead screw with cooperating internal threads. Rotation of the lead screw does not advance the carrier having the information transfer device until after one complete revolution of the lead screw, whereupon the cam surface and cam follower permit the information transfer device to axially advance a predetermined distance, such as, for example, one printing swath.

15 Claims, 2 Drawing Sheets

SLOW SCAN STITCHING MECHANISM

BACKGROUND OF THE INVENTION

The present invention relates to a slow scan stitching mechanism for an information transfer device and more particularly, but not exclusively, to such mechanisms for use in thermal ink jet printing and document scanning devices.

According to the present state of document scanning and printing technology, it is most cost effective to use a printhead (for example in thermal ink jet printing) having a width less than that of a full page. This means that scanning an entire document in one pass of the printhead is not possible and necessitates the butting of adjacent scan lines (known as stitching). Tolerances in the relative location of the butted scan lines is critical, and must be kept low in order to avoid objectionable defects in print quality.

Document scanning and printing devices are known in which the motion of the paper (or cartridge rail assembly motion) is used to achieve the above-mentioned precision stitching. The incrementing of the printhead in a particular direction (the slow scan direction) is done between successive printed swaths or scan lines, during which the paper is scanned in a perpendicular, fast scan direction. This successive incrementing is usually achieved by means of stepper motors, d.c. servomotors, or ratchet paw assemblies.

The primary problem with such architectures is a low print speed, due to the time required to increment the paper or guide rail assembly. Also, it is necessary to provide a separate drive mechanism for movement in both the slow scan and the fast scan directions, which adds to the mechanical and electrical complexity of scanning and printing devices.

SUMMARY OF THE INVENTION

It is an object of the invention to provide a slow scan stitching mechanism in which the time required for each stitch between successive printed swaths or scan lines is significantly reduced, compared with conventional devices.

It is a further object of the invention to provide a slow scan stitching mechanism having fewer mechanical parts compared with conventional devices and capable of producing accurate incrementation to successive scan lines.

A still further object is to provide a high quality stitching mechanism at reduced cost.

Another object of the invention is to provide a printing, scanning, copying or plotting device having an improved slow scan stitching mechanism.

The present invention provides a slow scan stitching mechanism for an information transfer device, comprising: a lead screw axially resiliently biassed in a first direction and arranged to be rotatably driven about its axis; a head carrier provided with an information transfer head and mounted on the lead screw, the head carrier and the lead screw having co-operating threads; a cam surface provided at one end of the lead screw and adapted to engage a fixed cam follower; wherein the lead screw thread and the cam surface are shaped such that the information transfer head is advanced stepwise in said first direction, and such that one advancement by a predetermined step length occurs substantially instantaneously during each complete revolution of the lead screw.

The cam surface is preferably shaped such that, during each complete revolution of the lead screw, the displacement of the lead screw with respect to the fixed follower in a second direction, opposite to the first direction, varies by an amount equal to the pitch of the thread, so that the information transfer head remains stationary during the interval between its successive advancements. In the preferred embodiment the instantaneous advancements are produced by a step discontinuity in the cam surface. The mechanism preferably includes a substantially disc-shaped cam on which the cam surface is provided, the cam being fixedly mounted coaxially with the lead screw at one end of the lead screw. The axially-facing cam surface is formed in such a way that the axial distance between a point on the cam surface and the aforementioned end of the lead screw varies uniformly with angular position on either side of the step discontinuity.

Preferably, the pre-determined step length of the stepwise advancement of the head is equal to the width of the information transfer head, for example ½" (12.7 mm). The pitch of the lead screw thread is equal to the pre-determined step length.

The mechanism preferably includes a support bar extending parallel to the axis of the lead screw and fixed with respect to the follower. The lead carrier is slidably supported on the bar by means of a collar, thereby enabling the lead carrier to be reciprocated back and forth along the bar under the action of the rotating lead screw. The information transfer head, such as a printhead or a scanner head, is aligned along an axis perpendicular to the axis of the lead screw. Preferably a support device is provided for supporting an information receiving medium (such as a blank sheet of paper in a print apparatus), or an information display medium (such as a printed sheet in a document scanning apparatus), and for transporting the medium, relative to the information transfer head and in close proximity thereto, in a direction perpendicular to both the axis of the lead screw and the axis of the information transfer head. This transportation causes a predetermined width or swath (i.e. in the fast scan direction) of the information receiving or display medium to be printed or scanned during each complete revolution of the lead screw, so that one or more lines of text is printed or scanned per revolution.

Preferably an information receiving or displaying sheet is releasably attached around the outer surface of a cylindrical drum, so that the width of the sheet extends circumferentially around the drum. The attachment of the sheet to the drum may be achieved by means of vacuum or electrostatic attraction, or by using spring clips to clamp the leading edge of the sheet. The drum is mounted with its axis parallel to that of the lead screw and arranged to be rotatably driven about its axis, for example, by an electric motor. A coupling belt mechanically couples the drum to the lead screw in such a way that one complete revolution of the drum produces one complete revolution of the lead screw. Alternatively the transporting device may include a flat platen on which a paper or other sheet is releasably attached, the platen being movable relative to the print or scan head so that alternate lines of the sheet may be scanned or printed in opposite directions. In both cases, during the transition between the beginning of the upper line of the information receiving or display sheet and the end of its lower line, the entire text area of the sheet may be scanned or printed.

The information receiving medium may comprise a paper document, a plastics transparency, or any other similar medium.

The printhead may comprise a thermal ink jet printhead or any other suitable printhead. The scanner head may comprise an optical or magnetic scanner read head, and may comprise a character or image scanner read head.

BRIEF DESCRIPTION OF THE DRAWINGS

An embodiment of the present invention will be described, by way of example, with reference to the accompanying drawings, in which.

DESCRIPTION OF THE PREFERRED EMBODIMENT

Figure 1:
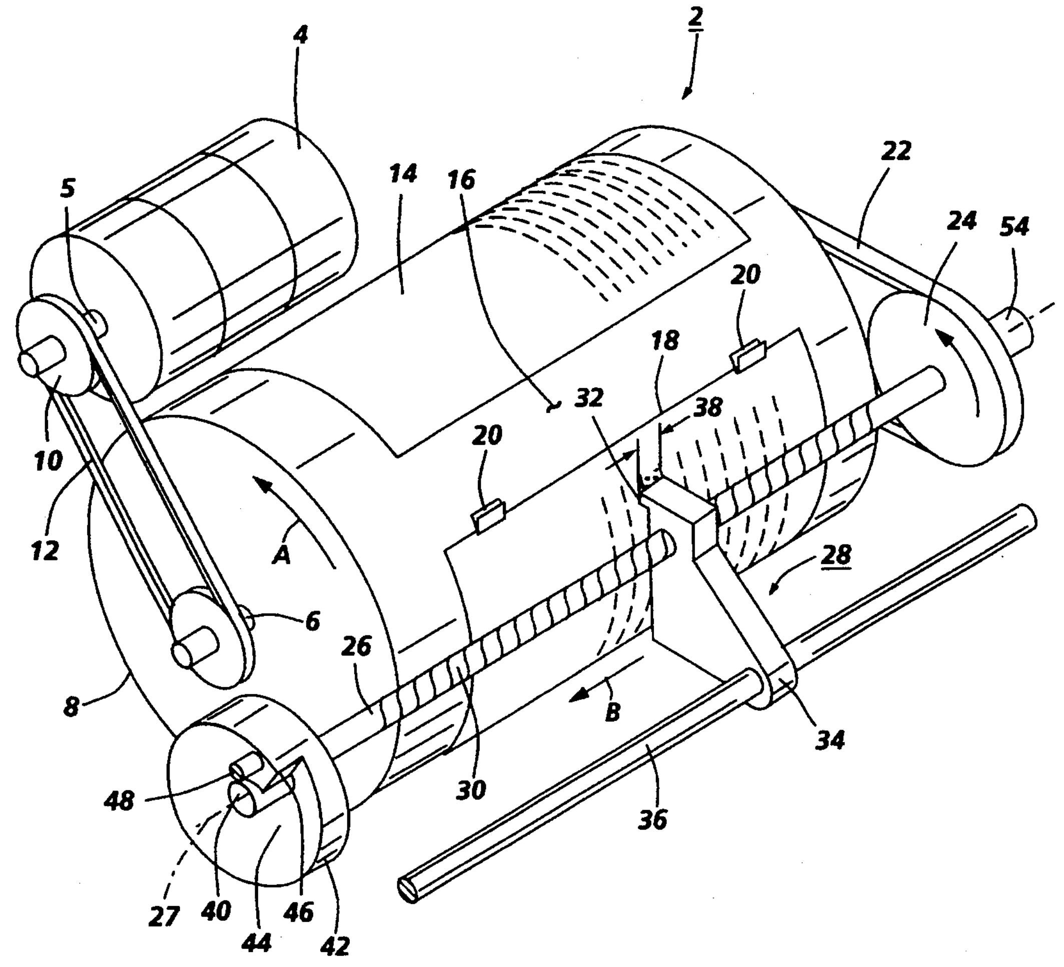
FIG. 1 is a partial perspective view of a slow scan stitching mechanism according to a preferred embodiment of the invention.

Referring to FIG. 1, the essential components of a printing apparatus, generally designated 2, are shown; the outside covers or case and associated supporting components of the printing apparatus are omitted for clarity.

The printing apparatus 2 includes a constant speed electric motor 4 connected to a suitable power supply (not shown) and arranged with its output shaft 5 parallel to the axle 6 of a cylindrical drum 8, which is supported for rotation on bearings (not shown). A clutch 10 permitting direct engagement with output shaft 5, and a drive belt 12 enable the drum 8 to be continuously rotationally driven by the motor 4 (in the direction of arrow A) at a pre-determined rotational speed.

A sheet of paper 14 is placed over the outer surface 16 of the drum 8, with the leading edge 18 of the sheet 14 releasably attached to the surface 16 by means of clips 20. A further drive belt 22 couples the end (not shown) of the axle 6 opposite the drive belt 12 to a pulley wheel 24. The wheel 24 is attached to one end portion of a lead screw 26. The lead screw is arranged with its axis parallel to the axis of the drum 8 and supported by fixed bearings (not shown in FIG. 1) which enable the lead screw to slidably translate axially. As explained more fully with respect to FIGS. 2 and 3, the end of lead screw 26 nearer the pulley wheel 24 slidingly resides in barrel 54 which contains a spring (not shown in this Figure) which axially urges the lead screw in a direction away from the barrel. The end of the lead screw opposite the end in the barrel has a cam 42 with cam surface 44 which rotates against fixed cam follower 48. A head carrier 28 is mounted on the lead screw, with an internal thread (not shown) in the head carrier 28 cooperating with the thread 30 of the lead screw 26. The head carrier 28 incorporates a thermal ink jet printhead 32 disposed immediately opposite the sheet 14, and a collar section 34. The thermal ink jet printhead being of the type disclosed in U.S. Pat. No. 4,774,530 and U.S. Pat. No. 4,571,599 and incorporated herein by reference. An elongate support bar 36 is arranged parallel to and below the axis of the lead screw, the collar section being slidable over the bar 36 during movement of the head carrier 28 on the lead screw such that the printhead 32 is maintained in the same orientation with respect to the adjacent sheet 14 during such movement.

During each rotation of the drum 8 one line or swath 38 is printed, and during the interval between the printing of successive lines or swaths the printhead 32 is advanced by a distance equal to the width of the printed swath 38 in the direction of arrow B, for example 0.5 in; 12.7 mm, after the swath is printed as explained more fully below with respect to FIGS. 2 and 3. Thus the printhead 32 advances stepwise down the page, printing one swath per step, until the end of the last swath is reached; whereupon, the head carrier 28 may be returned to its initial position, and the next sheet 14 can be printed with the printhead 32 advancing stepwise in the direction of arrow B.

Figure 2:
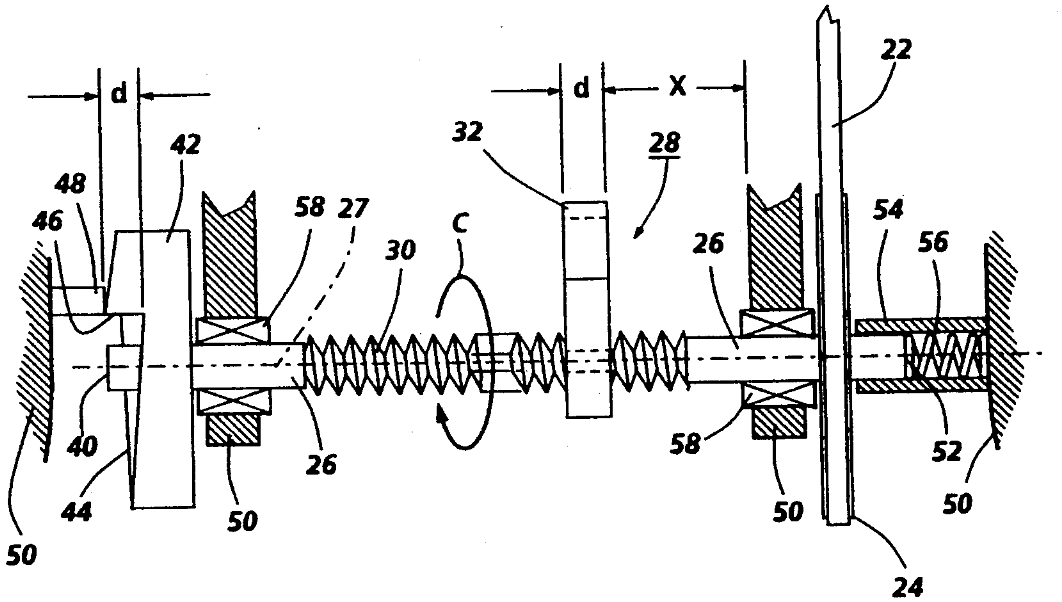
FIG. 2 shows a plan view of the mechanism of FIG. 1, at the instant immediately before a slow scan stitch.
Figure 3:
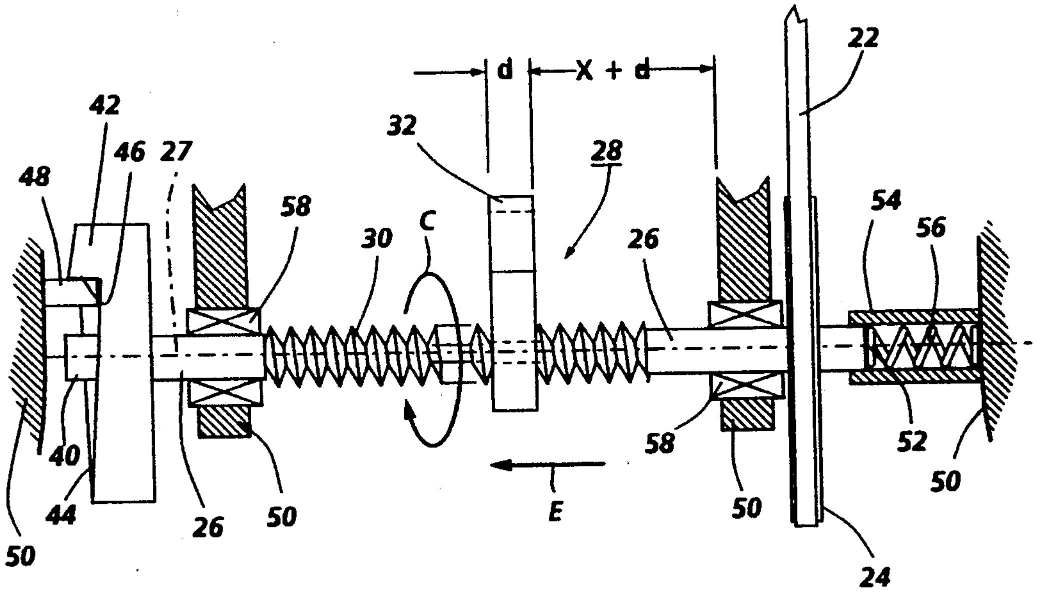
FIG. 3 shows a plan view of the mechanism of FIG. 1, at the instant immediately after a slow scan stitch.

Referring to FIGS. 2 and 3, these show a plan view of the printhead scanning and stitching mechanism. Adjacent one end 40 of the lead screw 26, a substantially disc shaped cam 42 is attached co-axially with the lead screw 26. The cam surface 44 on the cam 42 faces substantially in an axial direction and the position of the surface 44 varies in an axial direction linearly with angular position on either side of a discontinuity or step 46. A cam follower 48 which is fixed to the frame or case 50 of the printing apparatus abuts the cam surface 44.

The other end 52 of the lead screw 26 is located within a barrel 54 fixed to the case 50. Inside the barrel 54 a spring 56 abuts the inner surface of the case 50 and urges the lead screw axially from right to left in FIGS. 2 and 3. Support for the lead screw 26, as it is rotated about its axis 27, is provided by bearings 58 mounted in frame 50. Bearings 58 allow axial slip of the lead screw therethrough caused by the action of spring 56 and cam 42.

The sequence of operation of the stitching mechanism is as follows. The lead screw 26 is driven (by means of drive belt 22 and wheel 24) such that one revolution of the drum 8 (fast scan direction) causes one revolution of the lead screw 26 (in the direction of arrow C). The thread 30 is cut such that one revolution of the lead screw 26 translates the print head 32 to the left by a distance d (0.5 in; 12.7 mm) relative to the lead screw 26 which is equal to printed swath 38. The cam 42 is cut such that the interaction of the cam surface 44 with the follower 48 during the same revolution causes an axial translation of the lead screw 26 to the right by a distance d (0.5 in; 12.7 mm). Therefore, for almost the entire duration of the revolution, the rotation of the lead screw 26 does not cause translation of the printhead 32 relative to the case 50 or sheet 14 on drum 8, as indicated by distance X between the frame 50 and printhead 32. The printhead remains stationary while a line or swath of text is printed, up to the position shown in FIG. 2. Further rotation causes the follower 48 to slide over the step 46 and the lead screw 26 to advance substantially instantaneously to the left (arrow E) by a distance d (0.5 in; 12.7 mm) under the force of the expanding spring 56 as indicated by the distance X+d between the frame 50 and printhead 32. In this way, the printhead 32 is rapidly advanced to the next printline location (a slow scan stitch). The rotation of the drum and the printhead advance mechanism are synchronized so that each of these advancements occurs in the non-printing portion of the print line. Pulley wheel 24 is fixed to the lead screw and moves therewith, but the distance d is small in comparison to the distance between the drum axle 6 and lead screw 26, so that belt 22 is substantially unaffected by the relatively slight movement of pulley wheel 24.

The above-described sequence is continued until a whole page is printed. When the last line of the page has been printed, the printhead is returned to the start of page position.

Many modifications and variations are apparent from the foregoing description of the invention, and all such modifications and variations are intended to be within the scope of the present invention.

We claim:

1. A slow scan stitching mechanism for an information transfer device, comprising:

a rotatably mounted lead screw having a thread, an axis, and opposing ends, the lead screw being axially resiliently biassed in a first of said opposing ends and being rotatably driven about the lead screw axis;

a head carrier having an information transfer head and an internal thread, the head carrier being mounted on the lead screw with the head carrier internal thread and lead screw thread being cooperatively engaged;

a cam being fixedly provided at another end of said opposite ends of the lead screw, the cam having a cam surface substantially perpendicular to the lead screw axis, the cam surface having a step with a predetermined step length; p1 a fixed cam follower engaging the cam surface, the cam surface being urged against the cam follower by the resilient biasing of the lead screw in said first direction; and the lead screw thread and the cam surface being shaped such that the information transfer head is maintained in a fixed location when the lead screw and cam are rotated for substantially one revolution and then are advanced in said first direction by the resilient biasing of the lead screw when the cam follower reaches the cam surface step, said advance in the first direction being equal to the predetermined step length, so that the information transfer head is advanced by said cam surface step substantially instantaneously during each complete revolution of the lead screw.

2. A mechanism according to claim 1, wherein the cam is a substantially disc-shaped cam with an axis and is fixedly mounted coaxially with the lead screw; wherein the cam surface is substantially circular and the step in the cam surface is radially disposed from the cam axis; and wherein said cam surface varies uniformly in the axial direction of the cam axis with angular position about the cam axis on either side of said cam surface step.

3. A mechanism according to claim 2 wherein the information transfer head has a predetermined width, and wherein said predetermined step length of said cam surface step is equal to the width of said information transfer head.

4. A mechanism according to claim 3, further comprising an elongate support member extending parallel to the axis of the lead screw; wherein the head carrier is provided with a collar section enabling the head carrier to be slidably mounted on the elongate support member so that said information transfer head is maintained in an appropriate orientation during movement along the lead screw.

5. A mechanism according to claim 3, wherein the mechanism further includes a means for transporting an information receiving surface or display surface in a direction perpendicular to the first direction, the receiving surface or display surface having predetermined dimensions and being transported by said transporting means past the information transfer head and in close proximity with said transfer head.

6. A mechanism according to claim 5, wherein, during each revolution of the lead screw, the information transfer head scans a portion of said receiving surface or display surface in one dimension, the width of the portion scanned being equal to the predetermined width of said information transfer head; and wherein the scanning by the information transfer head is conducted during each revolution of the lead screw, each revolution being initiated with the cam follower located adjacent but immediately past the cam surface step.

7. A mechanism according to claim 6, further comprising a cylindrical drum having an outer surface and an axis; wherein said information receiving surface or display surface is disposed on the outer surface of said cylindrical drum, said one dimension extending circumferentially around the drum; wherein said drum is mounted with its axis parallel to the axis of the lead screw; and wherein the drum is driven about the drum axis.

8. A mechanism according to claim 7, further including an electric motor being connected to said drum to rotatably drive said drum; and coupling means for drivingly coupling the drum to the lead screw, whereby each revolution of the drum produces one revolution of the lead screw.

9. A mechanism according to claim 7, wherein, during successive advancements of the information transfer head in the first direction between initial and final positions on the lead screw, said head scans portions of said information receiving surface or display surface one portion thereof at a time in a direction extending parallel to said first direction, until the entire receiving surface or display surface is scanned.

10. A mechanism according to claim 7, wherein the information receiving or display surface comprises an outer surface of a sheet wrapped around the drum and the drum includes means for detachably retaining the sheet on the drum.

11. A mechanism according to claim 7, wherein the information receiving surface or display surface comprises a surface of a document; and wherein the information transfer head comprises a read head of a document scanner.

12. A mechanism according to claim 7, wherein the information transfer head comprises a printer head.

13. A mechanism according to claim 12, wherein the printer head comprises a thermal ink jet printer head.

14. A mechanism according to claim 1, wherein said rotatably mounted lead screw is mounted in at least two fixed bearings located adjacent the lead screw ends, at which bearing locations a portion of the lead screw is without a thread, each of the bearings slidingly surrounding the lead screw portion without threads, thereby allowing axial slip of the lead screw therein.

15. A slow scan stitching mechanism for an information transfer device, comprising:

a lead screw having an external thread between two opposing ends and an axis, the lead screw being rotatably driven about the lead screw axis in at least two fixed bearings located adjacent the lead screw ends, each of said bearings slidingly surrounding a portion of the lead screw without an external thread, thereby allowing axial slip of the lead screw therein;

a disc shaped cam having an axis and a cam surface, the cam being coaxially attached to one of said end of the lead screw for rotation therewith, the cam surface being substantially perpendicular to the lead screw axis and having a step thereon with a predetermined step length;

a fixed cam follower;

means for axially urging another end of said opposing ends of the lead screw in a direction towards the cam, so that the cam surface is continually urged against the cam follower;

a head carrier having an internal thread and an information transfer head, said head carrier being mounted on the lead screw with the head carrier thread and lead screw thread cooperatively engaged; and the lead screw thread and the cam surface being shaped such that the information transfer head is maintained in a stationary position when the lead screw and cam are rotated for substantially one revolution and then is advanced along the axis of the lead screw in the direction of the urging by said urging means by the same distance as said length of the cam surface step, when the cam surface is rotated so that the cam follower reaches the cam surface step, the cam and cam follower slidably displacing the lead screw in an axial direction through the bearings opposite the urging direction of said urging means until the cam follower reaches the cam surface step, whereat the means for urging the lead screw advances the information transfer head axially for a distance equal to the length of the cam surface step.

* * * * *